United States Patent
Singh

(10) Patent No.: US 9,160,736 B2
(45) Date of Patent: *Oct. 13, 2015

(54) SYSTEM AND METHOD OF VERIFYING A NUMBER OF A MOBILE TERMINAL

(71) Applicant: Synchronoss Technologies, Inc., Bridgewater, NJ (US)

(72) Inventor: Sumeet Sohan Singh, Saratoga, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,585

(22) Filed: Dec. 30, 2014

(65) Prior Publication Data

US 2015/0113624 A1    Apr. 23, 2015

Related U.S. Application Data

(63) Continuation of application No. 13/304,562, filed on Nov. 25, 2011, now Pat. No. 8,959,604.

(51) Int. Cl.
| | |
|---|---|
| *G06F 21/00* | (2013.01) |
| *H04L 29/06* | (2006.01) |
| *G06F 21/43* | (2013.01) |
| *G06F 21/44* | (2013.01) |
| *H04W 12/06* | (2009.01) |
| *H04W 4/14* | (2009.01) |
| *H04W 12/10* | (2009.01) |
| *H04M 1/725* | (2006.01) |

(52) U.S. Cl.
CPC ............... *H04L 63/08* (2013.01); *G06F 21/00* (2013.01); *G06F 21/43* (2013.01); *G06F 21/44* (2013.01); *H04W 4/14* (2013.01); *H04W 12/06* (2013.01); *H04W 12/10* (2013.01); *G06F 2221/2129* (2013.01); *G06F 2221/2137* (2013.01); *H04L 2209/16* (2013.01); *H04M 1/72522* (2013.01)

(58) Field of Classification Search
CPC ......... H04L 63/08; G06F 21/00; G06F 21/43; H04W 4/14; H04W 12/06; H04W 12/10
See application file for complete search history.

(56) References Cited

U.S. PATENT DOCUMENTS

| | | | | | |
|---|---|---|---|---|---|
| 5,204,902 | A | * | 4/1993 | Reeds et al. | 380/248 |
| 6,253,326 | B1 | * | 6/2001 | Lincke et al. | 726/12 |
| 7,337,229 | B2 | * | 2/2008 | Dutta et al. | 709/229 |
| 7,734,919 | B2 | * | 6/2010 | Maeoka et al. | 713/169 |
| 8,073,954 | B1 | * | 12/2011 | Tu et al. | 709/227 |
| 8,687,038 | B2 | * | 4/2014 | Gonen et al. | 348/14.01 |
| 8,751,801 | B2 | * | 6/2014 | Harris et al. | 713/168 |

(Continued)

*Primary Examiner* — Taghi Arani
*Assistant Examiner* — Sharon Lynch
(74) *Attorney, Agent, or Firm* — Haverstock & Owens LLP

(57) ABSTRACT

A client device is coupled with a server. The client device prompts a user to enter a number associated with a mobile device, which can be the client device, and generates data including a code. The code is typically hidden from the user when the code is generated and is saved on the client device. The client device transmits the number entered by the user and the code generated by the client device to the server, which sends a message, including the code, to the mobile device associated with the number. The client device prompts the user to enter the code included in the message. Validity of the number is based on one or more factors, including the accuracy of the code entered by the user. In addition, validity of the number can also be based on whether the second user input was entered within a predetermined time limit.

19 Claims, 5 Drawing Sheets

(56) References Cited

U.S. PATENT DOCUMENTS

| | | | |
|---|---|---|---|
| 8,774,781 B1* | 7/2014 | Speiser et al. | 455/414.3 |
| 2003/0158960 A1* | 8/2003 | Engberg | 709/237 |
| 2003/0163483 A1* | 8/2003 | Zingher et al. | 707/104.1 |
| 2004/0174965 A1* | 9/2004 | Brahm et al. | 379/88.19 |
| 2005/0268107 A1* | 12/2005 | Harris et al. | 713/182 |
| 2006/0098678 A1* | 5/2006 | Tan | 370/441 |
| 2006/0206709 A1* | 9/2006 | Labrou et al. | 713/167 |
| 2006/0268842 A1* | 11/2006 | Takahashi et al. | 370/352 |
| 2007/0016796 A1* | 1/2007 | Singhal | 713/183 |
| 2007/0022469 A1* | 1/2007 | Cooper et al. | 726/3 |
| 2007/0226783 A1* | 9/2007 | Mimlitsch | 726/4 |
| 2008/0005080 A1* | 1/2008 | Xiques et al. | 707/3 |
| 2008/0051117 A1* | 2/2008 | Khare et al. | 455/458 |
| 2008/0109881 A1 | 5/2008 | Dasdan | |
| 2008/0270805 A1* | 10/2008 | Kean | 713/189 |
| 2009/0183091 A1 | 7/2009 | Sharpe et al. | |
| 2009/0205036 A1* | 8/2009 | Slaton et al. | 726/9 |
| 2009/0275331 A1* | 11/2009 | Maitreya et al. | 455/435.1 |
| 2009/0287921 A1* | 11/2009 | Zhu et al. | 713/155 |
| 2009/0307486 A1* | 12/2009 | Grajek et al. | 713/156 |
| 2010/0058064 A1* | 3/2010 | Kirovski et al. | 713/176 |
| 2010/0100945 A1* | 4/2010 | Ozzie et al. | 726/5 |
| 2010/0205448 A1* | 8/2010 | Tarhan et al. | 713/185 |
| 2010/0241857 A1* | 9/2010 | Okude et al. | 713/168 |
| 2011/0269424 A1* | 11/2011 | Multer et al. | 455/411 |
| 2012/0151346 A1* | 6/2012 | McClements, IV | 715/716 |
| 2012/0210127 A1* | 8/2012 | Kameda et al. | 713/168 |
| 2012/0221437 A1* | 8/2012 | Yoo | 705/26.41 |
| 2012/0223133 A1* | 9/2012 | Miller et al. | 235/379 |
| 2012/0226778 A1* | 9/2012 | Minborg et al. | 709/218 |
| 2012/0240203 A1* | 9/2012 | Kling | 726/5 |
| 2013/0041959 A1* | 2/2013 | Bengtsson | 709/206 |
| 2014/0047519 A1* | 2/2014 | Faryna | 726/5 |

* cited by examiner

US 9,160,736 B2

SYSTEM AND METHOD OF VERIFYING A NUMBER OF A MOBILE TERMINAL

RELATED APPLICATIONS

This application is a continuation of co-pending of U.S. patent application Ser. No. 13/304,562, filed on Nov. 25, 2011, entitled SYSTEM AND METHOD OF VERIFYING A NUMBER OF A MOBILE TERMINAL, which is hereby incorporated by reference.

FIELD OF THE INVENTION

The present invention relates to an improved system and method of verifying a number of a mobile terminal entered by a user, in which number verification is performed on the client side.

BACKGROUND OF THE INVENTION

Web services typically require their users to verify their accounts by using their mobile numbers before the users are allowed to access certain features of the web services. Prior art mobile number verification process is performed on the server side. For example, a social networking site allows its users to use its services via text message. However, a user must first verify their account by adding a mobile number to their account. Generally, a mobile number is that of a mobile device capable of receiving SMS text messages and needing verification. The prior art verification application then generates and sends a confirmation code as part of an SMS text message to a device associated with the mobile number, which is generally the user's mobile phone. The confirmation code and some form of identity, such as the mobile number entered by the user, are stored in a database prior to the mobile number being validated. If the user enters the correct mobile number and if the user's mobile phone is capable of receiving SMS, the user will receive the SMS text message containing the confirmation code. The user, after receiving the SMS text message on their mobile phone, returns to the prior art verification application to enter the confirmation code found in the SMS text message. Upon receiving the entered confirmation code, the prior art verification application verifies the user-entered confirmation code with the stored confirmation code that is in the database and accepts the mobile number as valid if they match. After the mobile number is determined to be valid, the user is able to take advantage of certain features of social networking site.

There are drawbacks with this prior art method of verifying mobile numbers. For example, since a web service operator must maintain a database(s) of all mobile numbers and associated codes served out to prospective users, there may be potentially millions, or even billions, of expired codes in the database(s) due to users initiating but never completing the verification process or due to repeat attempts simply because a user failed to receive a text message containing a confirmation code. The costs associated with developing and maintaining such database(s), the underlying storage and networking infrastructure are extremely high.

The present invention addresses at least these limitations in the prior art.

SUMMARY OF THE INVENTION

Embodiments of the present invention are directed to a system and method of verifying a number of a mobile terminal. Unlike prior art verification processes, which are done on the server side, the verification process in accordance with the present invention is a client-side process and is done on a client device. The client device is typically communicatively coupled with a server via a network. The server is a stateless server configured to receive data from the client device and to send data to a mobile device, which can be the client device itself. The client device prompts a user to enter a mobile number associated with a mobile device and generates data including a code. The client device can be the mobile device associated with the mobile number, a different mobile device, or a computing device. The code is typically hidden from the user when the code is generated and is saved on the client device. The client device transmits the mobile number entered by the user and the code generated by the client device to a server, which uses the mobile number to send a message, including the code, to the mobile device associated with that mobile number. The client device prompts the user to enter the code included in the message. Validity of the mobile number is based on one or more factors, including the accuracy of the code entered by the user. In addition, validity of the mobile number can also be based on whether the second user input was entered within a predetermined time limit.

In one aspect, a client device includes a processor and an application executed by the processor. The client device can be a network-enabled device or a wireless communication device, such as computer, a laptop, a wireless terminal or a tablet to name a few. In some embodiments, the application first prompts a user to enter a number associated with a mobile terminal and captures that user input as a first input. The application then generates data including a code. The code can include a random alphanumeric string. Typically, the code is unknown to the user when the code is generated. In some embodiments, the first input, the data and a first date and time stamp are saved, such as in a memory of the client device.

The application transmits the code and the first input entered by the user to a server. The server is typically configured to send the code to a device associated with the first input. In some embodiments, the client device is the device associated with the first input. If the client device is the device associated with the first input, then after the client device receives the code from the server, the client device displays the code received from the server. The application prompts the user to enter the code displayed on the device and captures or obtains the user input as a second input. The application then determines validity of the first input.

In some embodiments, the validity determination of the first input includes comparing the second input with the code. In some embodiments, the validity determination of the first input further includes comparing a second date and time stamp with the first date and time stamp. The first date and time stamp is typically associated with the time of the transmission of the code and the first input entered by the user to the server. The second date and time stamp is typically associated with when the second input is obtained. If the second date and time stamp is not older than a programmable threshold and if the second input is the same as the code, then the first input is valid. Otherwise, the first input is invalid. In some embodiments, the application thereafter communicates with another server that the first input has been verified.

In another aspect, a client device includes a circuit. The circuit is configured to generate data including a code hidden from a user of the client device and to generate a transmission data stream, including the code and a first user input, to be transmitted to a server. The server is configured to send the code to a device associated with the first user input. In some embodiments, the server is a stateless server. In some embodiments, the client device is the device associated with the first user input. As such, the circuit is configured to receive a data stream from the server. The data stream from the server typically includes the code. The circuit is also configured to obtain a second user input after the device associated with the first user input receives the data from the server and to determine validity of the first input based on at least one factor including accuracy of the second user input. In some embodiments, the at least one factor also includes whether the second user input was obtained within a predetermined time limit.

In yet another aspect, a system is for verifying a mobile number. The system includes a network, at least one server communicatively coupled to the network, and at least one client device communicatively coupled to the network. Each client device is configured to generate data including a code hidden from a user of the client device and to transmit a first data stream, including the code and a first user input, to one of the at least one server. In some embodiments, the one of the at least one server is an echo server or has echo service. The one of the at least one server is configured to send at least the code to the client device. In some embodiments, the one of the at least one server is also configured to send a descriptive message to the client device. In some embodiments, the client device is configured to receive a second data stream, including at least the code, from the one of the at least one server. As such, the client device is configured to display the code received from the one of the at least one server and prompt the user to enter the code displayed on the client device. The client device is also configured to obtain a second user input. After the client device obtains the second user input from the user, the client device is configured to determine validity of the first user input based on at least one factor including accuracy of the second user input.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed to a system and method of verifying a number of a mobile terminal. Unlike prior art verification processes, which are done on the server side, the verification process in accordance with the present invention is a client side process and done on a client device. The verification process can be implemented in software or hardware. The client device is typically communicatively coupled with a server via a network. The server is a stateless server configured to receive data from the client device and to send data to a mobile device, which can be the client device itself. The client device prompts a user to enter a mobile number associated with a mobile device and generates data including a code. The client device can be the mobile device associated with the mobile number, a different mobile device, or a computing device. The code is typically hidden from the user when the code is generated and is saved on the client device. The client device transmits the mobile number entered by the user and the code generated by the client device to a server, which uses the mobile number to send a message, including the code, to the mobile device associated with that mobile number. The client device prompts the user to enter the code included in the message. Validity of the mobile number is based on one or more factors, including the accuracy of the code entered by the user. In addition, validity of the mobile number can also be based on whether the second user input was entered within a predetermined time limit.

Figure 1:
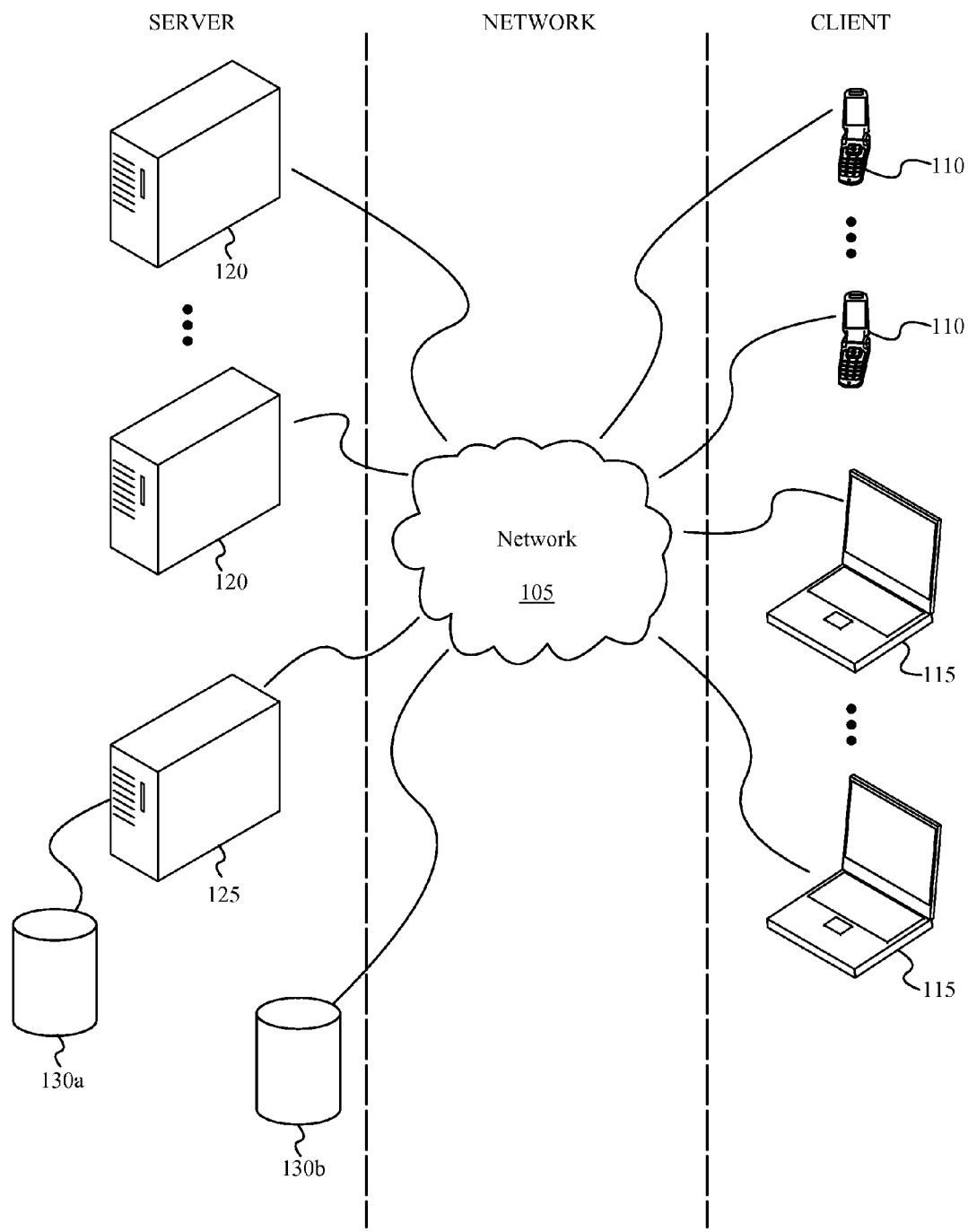
FIG. 1 illustrates a general overview of a system for implementing an embodiment of the present invention.

FIG. 1 illustrates a general overview of a system 100 for implementing an embodiment of the present invention. As shown in FIG. 1, one or more client devices are communicatively coupled with a network 105. It will be understood that the network 105 can be an Internet network, a cellular network maintained by a cellular carrier, such as a GSM or CDMA network, and/or some other wireless communications link. Data can be transmitted over the network in any number of known formats. Client devices include network-enabled devices 115 and wireless communication devices 110. Exemplary network-enabled devices 115 includes as computer workstations, personal computers, laptop computers, handheld computers, tablets, mini-computers, and other personal computing devices. Exemplary wireless communication devices 110 include cellular or mobile terminals. Client devices 110, 115 typically perform a client-side verification process, which has access to memory and certain capabilities.

Figure 2A:
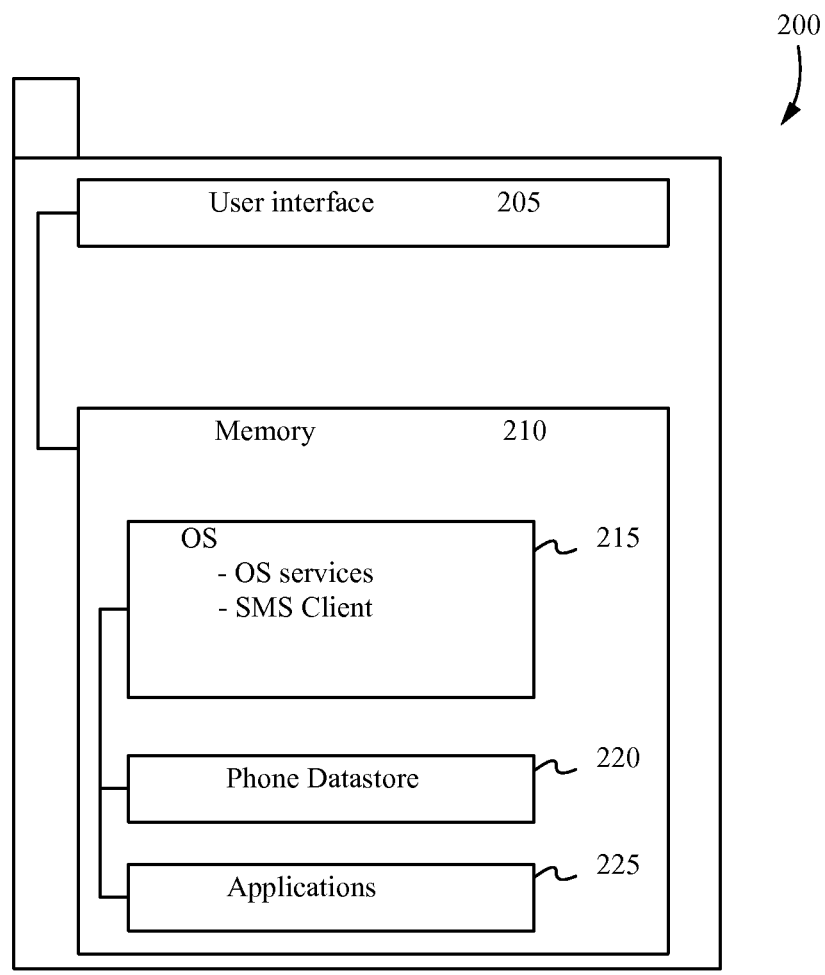
FIG. 2A illustrates a graphical representation of an exemplary mobile terminal in accordance with the present invention.

FIG. 2A illustrates a graphical representation of an exemplary mobile terminal in accordance with the present invention. The mobile terminal 200 is capable of being communicatively coupled to the network 105 to transmit voice and data communications to other devices communicatively coupled to the network 105. In general, a hardware structure suitable for implementing the mobile terminal 200 includes system memory 210 which may further include an operating system (OS) 215 having operating system services including telephony and linking services, networking services, multimedia and graphics display services all provided to a user interface (UI) 205. The OS 215 may be the mobile terminal's proprietary OS, BREW, or any other device or operating system suitable for a phone. The OS 215 also provides an SMS client built into the OS 215 allowing short messages to be provided across the network 105 to and from other users. The mobile terminal 200 includes a native phone data store 220 which contains an address book of contacts and other information which may be provided by a user. Such information can further include ringtones, pictures, sounds, and movies, all dependent on the functional capabilities of the mobile terminal 200, the space allowed in the system memory 210, and the services provided by the OS 215.

Applications 225, including a client-side verification application, various embodiments of which as described herein, are also loaded into the mobile terminal 200. As will be well understood by one of average skill in the art, the client-side verification application can be provided by a phone manufacturer or downloaded by the user at a later time. To download and install the client-side verification application, the user selects the client-side verification application from offerings provided by a source, such as a service provider, a carrier, or an enterprise service, and installs the client-side verification application onto the mobile terminal 200.

Figure 2B:
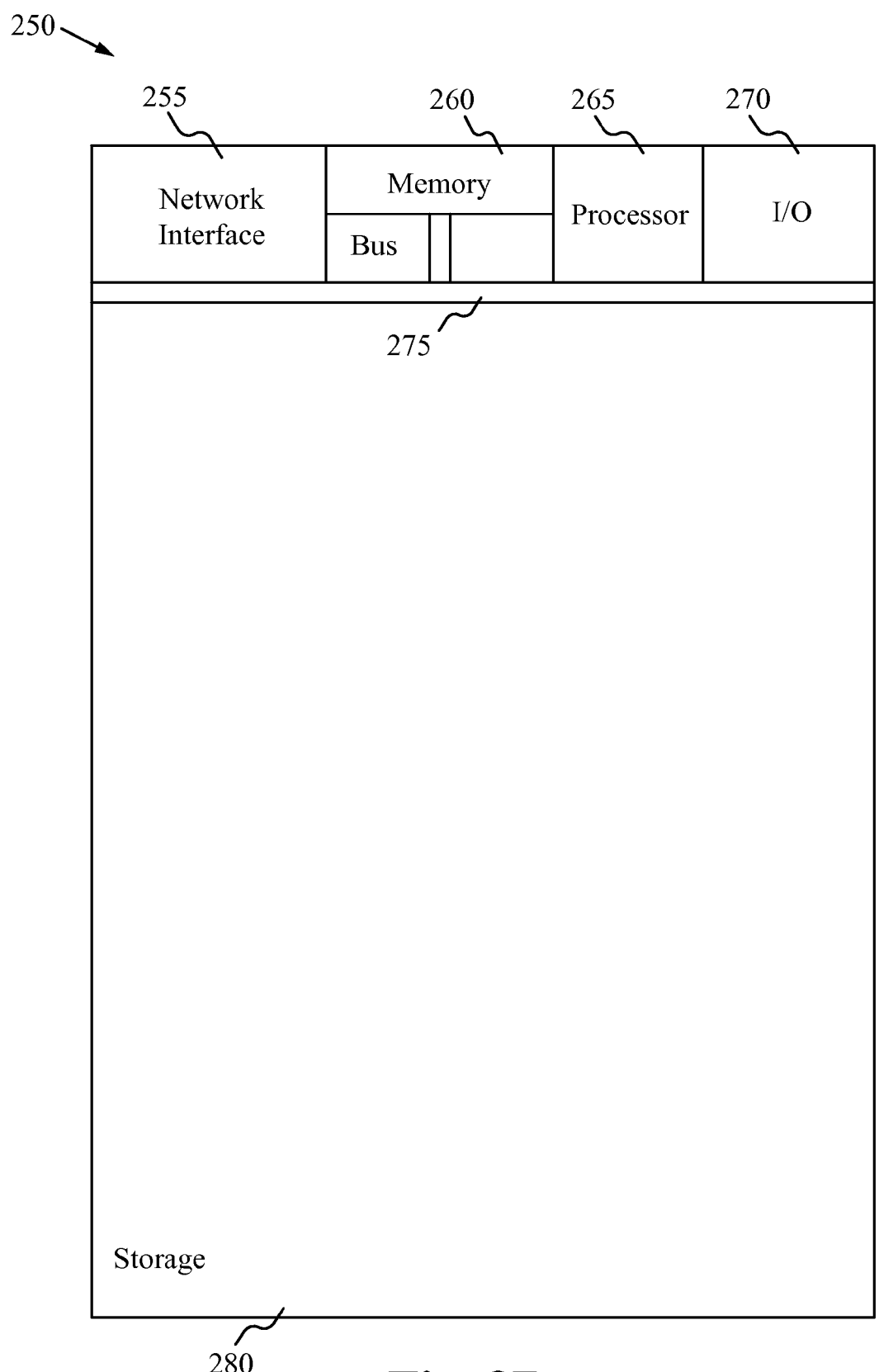
FIG. 2B illustrates a graphical representation of an exemplary computing device in accordance with the present invention.

FIG. 2B illustrates a graphical representation of an exemplary computing device 250 in accordance with the present invention. The computing device 250 is capable of being communicatively coupled to the network 105 to transmit data communications to other devices communicatively coupled to the network 105. In general, a hardware structure suitable for implementing the computing device 250 includes a network interface 255, a memory 260, processor 265, I/O device(s) 270, a bus 275 and a storage device 280. The choice of processor is not critical as long as the processor 265 has sufficient speed. The memory 260 is any conventional computer memory known in the art. The storage device 280 is a hard drive, CDROM, CDRW, DVD, DVDRW, flash memory card or any other storage device. The computing device is able to include one or more network interfaces 255. An example of a network interface includes a network card connected to an Ethernet or other type of LAN. The I/O device(s) 270 are able to include one or more of the following: keyboard, mouse, monitor, display, printer, modem and other devices. Applications, such as a browser application and a client-side verification application in accordance with an embodiment of the present invention, are likely to be stored in the storage device 280 and memory 260 and are executed by the processor 265.

Returning to FIG. 1, one or more servers 120 are communicatively coupled with the network 105. Each server 120 works independently from other servers 120. In some embodiments, each server 120 is only configured to send to a wireless communication device 110, content the server 120 had received from a client device 110, 115. The servers 120 can be echo servers or include echo service. The servers 120 can also be stateless servers that do not store any information. Alternatively, the servers 120 are configured to perform other functions other than the echo functionality, such as hosting one or more web services. Alternatively or in addition to, one or more web servers 125, which are also communicatively coupled with the network 105, are configured to host the one or more web services. One or more storage devices 130a, 130b are either directly or indirectly communicatively coupled with the network 105. Users are able to use network-enabled devices 115 and/or wireless communication devices 110 to access the one or more web services.

Figure 3:
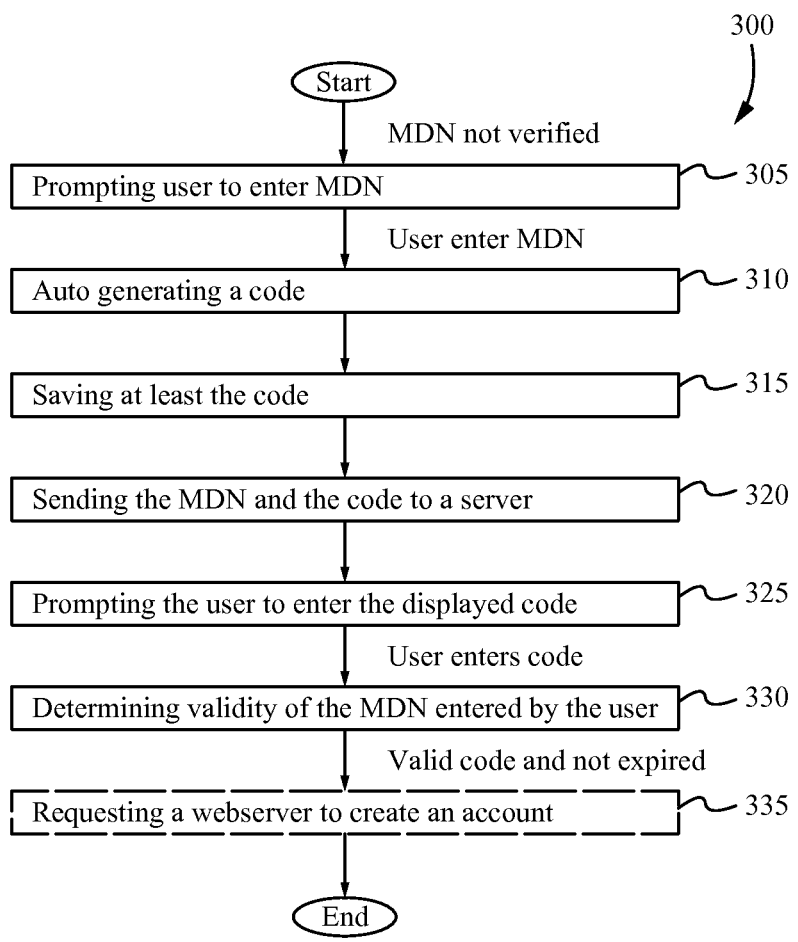
FIG. 3 illustrates a client-side method of verifying a mobile device number (MDN) of a mobile terminal in accordance with the present invention.

FIG. 3 illustrates a client-side method of verifying a mobile device number (MDN) of a mobile terminal in accordance with the present invention. The method 300 begins at a step 305, where a client-side verification application running on a client device prompts a user to enter the MDN associated with the mobile terminal. The client device can be the mobile terminal associated with the MDN, a different mobile terminal, or a computing device such as a personal computer. As discussed above, the client-side verification application can be provided by a phone manufacturer (if the client device is a wireless communication device) or downloaded by the user onto the client device. In some embodiments, before the client-side verification application prompts the user to enter the MDN associated with the mobile terminal, the client-side verification application displays introductory messages, such as terms and conditions.

At a step 310, the client-side verification application generates a code after receiving the MDN entered by the user. The code is typically unknown and not visible to the user when the code is generated. In some embodiments, the generated code is a random alphanumeric string code. The random code can be based on time of day, the MAC address of the client device, etc. However, the random code is typically not based on the MDN of the mobile terminal. In some embodiments, the code is eight characters long. The code can be longer or shorter than eight characters.

At a step 315, the client-side verification application saves the generated code, the entered MDN, and a first date and time stamp in the client device's memory. The first date and time stamp is associated with a step 320 or a time prior to the step 320. For example, the first date and time stamp can be associated with when the user enters the MDN, when the client-side verification application generates the code, or when the client-side verification application sends the code and the MDN to a server 120. In some embodiments, the MDN is saved prior to the client-side verification application sends the code and the MDN to a server 120.

At the step 320, the client-side verification application connects to one of one or more servers 120, and sends the generated code and the entered MDN to a server 120 over a network protocol. The server 120 is an echo server or has echo service. Before and/or during connection, the client-side verification application can display a message to the user asking the user to wait for a message to arrive at the mobile terminal associated with the MDN and to provide an input once the message is received. Typically, the client-side verification application includes location information regarding at least one server 120 to indicate which server to send the generated code and the entered MDN to. For example, the location information can be in the form of an URL, an IP address, or other suitable formats. In some embodiments, the server 120 is hosted on the Internet by an application operator. In some embodiments, since the server 120 and the source of the client-side verification application is controlled, operated and/or owned by the same entity, the server 120 is a trusted server. In some embodiments, the server 120 does not store any user information such as MDNs or codes. Instead, the server 120 simply sends a message to the mobile terminal associated with the MDN. The message can be an SMS text message. Typically, the SMS text message includes at least the generated code.

In some embodiments, the client-side verification application can include location information of more than one server 120 such that the client-side verification application can algorithmically or randomly choose a server 120 to use, or can use an alternative server 120 if the user requests a code to be resent or if a server 120 is down.

Assuming that the MDN entered by the user is incorrect, then the user will not receive the SMS text message from the server 120. Instead, the true owner of the mobile terminal associated with the entered MDN will receive the text message and will simply ignore the SMS text message because the SMS text message is not applicable to the true owner. In some embodiments, the SMS text message is a free message and, thus, the true owner will not be charged for the SMS text message.

Assuming that the MDN entered by the user is correct, then the user will receive the SMS text message on their mobile terminal. The SMS text message typically includes at least a code and can further include a descriptive message, such as "Your Bank of California code is:". The code in the SMS text message is the same code that the server 120 received from the client-side verification application. The user typically sees the code for the first time when the mobile terminal receives the SMS text message.

The user may need to return to the client-side verification application after receiving the SMS text message. At a step 325, the client-side verification application prompts the user to enter the code from the SMS text message.

At a step 330, the client-side verification application determines whether the MDN entered by the user at the step 305 is valid. Typically, the client-side verification application compares the user-entered code (from the step 325) with the saved code (from the step 315) and the current date and time stamp with the saved date and time stamp (from the step 315). If the user enters the same code as that saved in the client device within a desired time threshold, for example within 10 minutes or within one hour, then the MDN entered by the user is deemed valid. Put differently, if the second date and time stamp is not older than a programmable threshold and if the user-entered code is the same as the saved code, then the MDN is deemed valid. Otherwise, the MDN is deemed invalid.

In some embodiments, the date and time stamps are saved in the UTC (Co-ordinated Universal Time) format for easy comparison. Alternatively, the date and time stamps are converted to UTC when the date and time stamps are compared at the step 330.

After the MDN is validated, the client-side verification application typically performs additional functions before the client-side verification application terminates. For example, at an optional step 335, the client-side verification application communicates with a web server 125 that the MDN entered by the user is verified, such as by requesting the web server 125 to create an account for the user. The user can thereafter access a service hosted on the web server 125 using the same or different mobile terminal 110 or a network-enabled device 115. Depending on how much security is desired, varying levels of security can be applied at the step 335. After the step 335, the method 300 ends.

Figure 4:
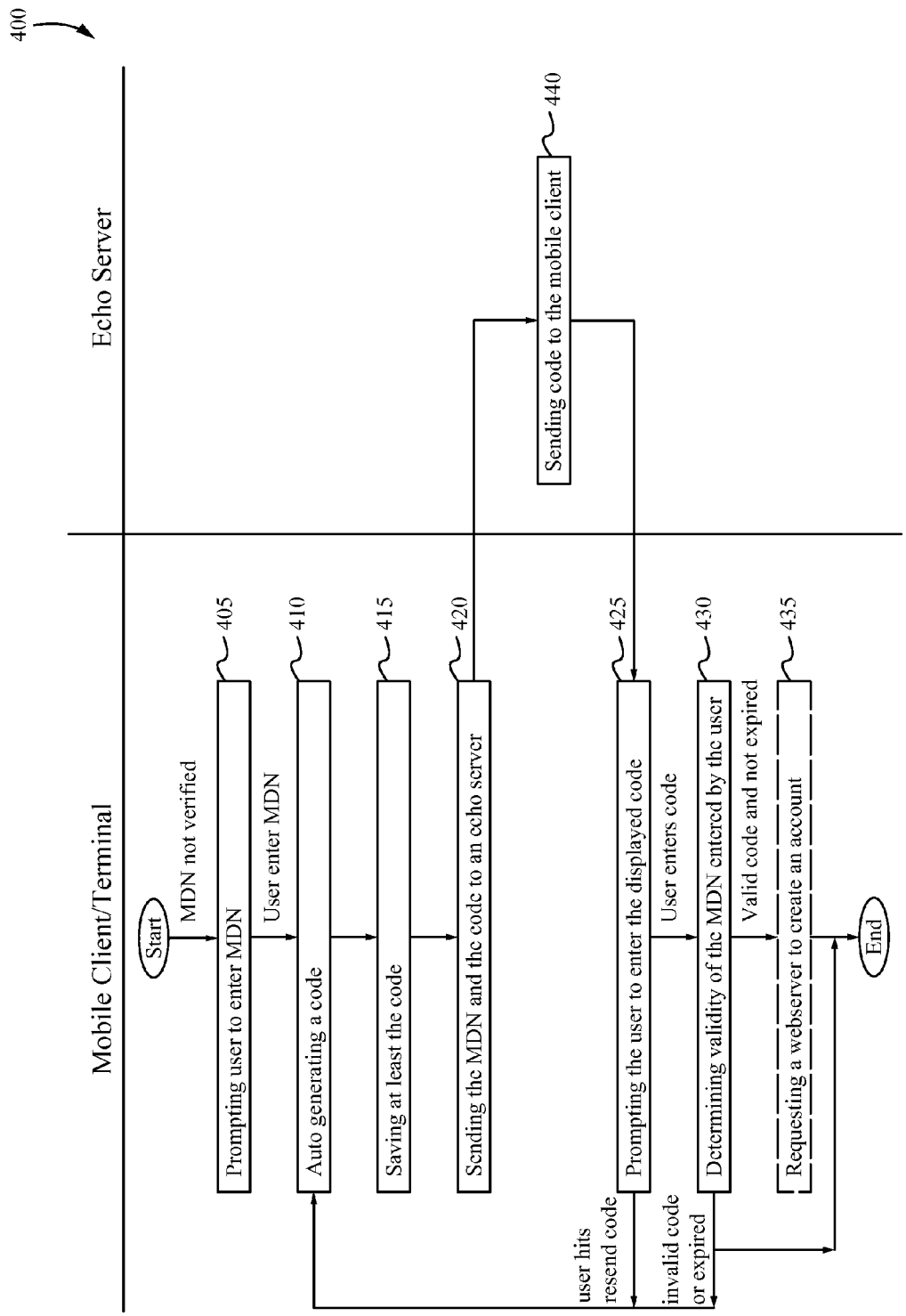
FIG. 4 illustrates exemplary client-server interactions in accordance with the present invention.

FIG. 4 illustrates exemplary client-server interactions in accordance with the present invention. The interactions are between an echo server and a client-side verification application running on a mobile terminal that the user is verifying the number of. Steps 405, 410, 415, 420, 425, 430 and 435 are the same as the steps 305, 310, 315, 320, 325, 330 and 335, respectively. After the step 420, where the mobile client sends the user-entered MDN and the generated code to the echo server, the echo server sends back an SMS text message to the mobile client based on the user-entered MDN. The SMS text message typically contains at least the generated code. The mobile client receives and displays the SMS text message.

At the step 425, the mobile client prompts the user to enter the code from the SMS text message. If the user did not receive the SMS text message, the user is able to request that a code be resent. In some embodiments, a new code is regenerated at the step 410. If the user did receive the SMS text message and enters a code, then, at the step 430, the mobile terminal determines the validity of the user-entered MDN based on factors including whether the user-entered code is the same as the saved code and when the user-entered code was entered. If the user-entered code is different from the saved code or if the user enters the code outside the allowed time period, a new code is regenerated at the step 410 or the user can simply quit the verification process. Otherwise, since the user-entered code is the same as the saved code was entered within the allowed time period, the user-entered MDN is verified. At the optional step 435, the client-side verification application requests a web server to create an account for the user.

Unlike prior art systems and methods of verifying a number of a mobile terminal, which were done on the server-side, the present invention performs the verification on the client-side using a client-side verification application. The client-side verification application can be running on a mobile terminal. Moreover, the client-side verification application can be running on a different mobile terminal than the one which receives the SMS message. Client-side verification application can similarly be running on a desktop computer or other client devices. The client-side verification application can be a native application or an application running within a browser and capable of storing information to disk, a solid-state memory (e.g., flash cards) or RAM. Since the client-side verification application and the web server are controlled and/or owned by the same entity, the client-side verification application is a trusted application.

It will be understood that although the methods of verifying a MDN are implemented using software in FIGS. 3-4, the method of verifying a MDN can also be implemented using hardware. In some embodiments, a client device includes a circuit. The circuit is configured to generate data including a code hidden from a user of the client device and to generate a transmission data stream, including the code and a user-entered MDN, to be transmitted to a server. The circuit can also be configured to receive a data stream from the echo server. The data stream from the server includes the code. The circuit is also configured to obtain a user-entered code after the client device receives the data stream from the server as an SMS text message. The circuit is also configured to determine validity of the user-input MDN based on at least one factor including accuracy of the user-entered MDN. In some embodiments, other factors include whether the user-entered MDN was obtained within a predetermined time limit.

Unlike prior art methods of verifying MDNs, the present invention need not create and pre-store codes that may ultimately become invalid because they have expired. Since web service operators are not maintaining databases of expired entries, costs associated with developing and maintaining such databases, the underlying storage and networking infrastructure are diminished. The present invention eliminates the database requirement in cases where an end-to-end application includes an on-the-device application (e.g., an iPhone application installed from iTunes, or an Android phone application installed from the Internet) provided by an application operator. The present invention is configured to work with web applications (e.g., those applications that require an Internet/web-service component, such as a banking application for the iPhone) and client applications (e.g., a game application that only requires a valid MDN for billing purposes).

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:

1. A client device comprising:
   a processor and a memory; and
   an application stored in memory and executed by the processor, the application for:
      generating, on the client device, data including a code which is hidden from a user of the client device;
      storing a copy of the code on the client device before the code is transmitted to a server;
      transmitting, from the client device, the code and a first input entered by the user to the server, wherein the code and first input are not stored on the server and the first input includes a number associated with a mobile terminal, and wherein the server is configured to thereafter, using the first input, send a descriptive message including the code received from the client device to a target device associated with the first input;

prompting, on the client device, for the user to enter the code as displayed on the target device;

obtaining, on the client device, a second input entered by the user; and determining, on the client device, validity of the first input by comparing the second input with the copy of the code stored on the client device.

2. The client device of claim 1, wherein the client device is the target device associated with the first input.

3. The client device of claim 1, wherein the client device is one of a network-enabled device and a wireless communication device.

4. The client device of claim 1, wherein the code comprises a random alphanumeric string.

5. The client device of claim 1, wherein the code is unknown to the user when the code is generated.

6. The client device of claim 1, wherein the application is also for saving the data generated and a first date and time stamp, wherein the first date and time stamp is associated with the time of transmission of the code and the first input entered by the user to the server.

7. The client device of claim 6, wherein determining validity of the first input includes comparing the second input with the code.

8. The client device of claim 7, wherein determining validity of the first input further includes comparing a second date and time stamp with the first date and time stamp, wherein the second date and time stamp is associated with when the second input is obtained.

9. The client device of claim 1, further comprising, before generating data including a code, prompting the user to enter a number associated with a mobile terminal and obtaining the first input entered by the user.

10. The client device of claim 1, wherein the application is also for saving the first input and communicating with another server that the first input has been verified.

11. The client device of claim 1, wherein the code and the first input are simultaneously transmitted to the server.

12. The client device of claim 1, wherein the code is sent directly from the server to the device associated with the first input.

13. A client device comprising a circuit configured to:

generate, on the client device, data including a code hidden from a user of the client device;

store a copy of the code on the client device before the code is transmitted to a server;

generate, on the client device, a transmission data stream, including the code and a first user input, to be transmitted to the server, wherein the code and first user input are not stored on the server and the first user input includes a number associated with a mobile terminal, and wherein the server is configured to thereafter, using the first user input, send a descriptive message including the code received from the client device to a target device associated with the first user input;

prompt, on the client device, for the user to enter a code displayed on the client device;

obtain, on the client device, a second user input entered by the user; and determine, on the client device, validity of the first input by comparing the second input with the copy of the code stored on the client device.

14. The client device of claim 13, wherein the client device is the device associated with the first user input.

15. The client device of claim 13, wherein the second user input is obtained after the device associated with the first user input receives the code from the server.

16. The Client device of claim 13, wherein at least one factor also includes whether the second user input was obtained within a predetermined time limit.

17. The client device of claim 13, wherein the circuit is also configured to receive the data stream from the server, wherein the data stream from the server includes the code.

18. A system for verifying a mobile number, the system comprising:

a network;

at least one server communicatively coupled to the network; and at least one client device communicatively coupled to the network, wherein each client device includes a processor, a memory and instructions stored therein, wherein the instructions when executed cause that client device to:

generate, on the client device, data including a code hidden from a user of the client device;

store a copy of the code on the client device before the code is transmitted to a server;

transmit, from the client device, a first data stream, including the code and a first user input, to one of the at least one server, wherein the code and first user input are not stored on the server and the first user input is a unique identifier of the target device, and wherein the at least one server is configured to, after receiving the first data stream from the client device, send a descriptive message including the code to a target device associated with the first user input;

prompt, on the client device, the user to enter the code as displayed on the target device;

obtain, on the client device, a second user input; and determine, on the client device, validity of the first user input by comparing the second input with the copy of the code stored on the client device.

19. The system of claim 18, wherein the one of the at least one server is an echo server.

* * * * *